United States Patent [19]

Ramsey

[11] Patent Number: 4,548,651
[45] Date of Patent: Oct. 22, 1985

[54] METHOD FOR RECLAIMING CONTAMINATED SCRAP METAL

[75] Inventor: Everett M. Ramsey, Richland, Ind.

[73] Assignee: Aluminum Company of America, Pittsburgh, Pa.

[21] Appl. No.: 682,818

[22] Filed: Dec. 18, 1984

Related U.S. Application Data

[63] Continuation of Ser. No. 488,923, Apr. 27, 1983, abandoned.

[51] Int. Cl.⁴ .............................................. B08B 7/00
[52] U.S. Cl. ....................................... 134/11; 134/18; 134/19; 134/25.1; 134/38; 134/40; 266/901
[58] Field of Search .................... 134/19, 25.1, 38, 40, 134/18, 11; 266/156, 901; 432/72

[56] References Cited

U.S. PATENT DOCUMENTS

| | | | |
|---|---|---|---|
| 3,627,289 | 12/1971 | Erman | 134/19 |
| 3,645,516 | 2/1972 | Turpin et al. | 266/901 X |
| 3,839,016 | 10/1974 | Rawlings | 266/901 X |
| 3,839,086 | 10/1974 | Larson | 134/19 |
| 4,252,300 | 2/1981 | Herder | 266/901 X |
| 4,264,060 | 4/1981 | Twyman | 266/901 X |

OTHER PUBLICATIONS

"A Preheating, Delacquering and Drying Process for Aluminum Scrap" by Noel H. Twyman and Lawrence E. Lannon of the Apros Corporation, Aluminum Association's *Aluminum Industry Energy Conservation Workshop VI Papers*, Nov. 9-10, 1981, pp. 157-165.

"Scrap Preheating Technology with Rotary Kiln Process" by Noel H. Twyman, Aluminum Association's *Aluminum Industry Energy Conservation Workshop IV Papers*, Jun. 19-20, 1979, pp. 1-15.

Apros Automated Production Systems Corporation brochure "Process Equipment and Systems for the Aluminum Recycling Industry", pp. 1, 2 and 4-7.

*Primary Examiner*—Marc L. Caroff
*Attorney, Agent, or Firm*—Brian D. Smith

[57] ABSTRACT

Scrap metal contaminated with hydrocarbon combustibles is reclaimed by vaporizing the hydrocarbon combustibles contaminating the metal in a kiln so as to produce partially unburned fumes in said kiln. The fumes are separated from the metal as the metal is discharged from the kiln, and the separated fumes are then transported to a heat generating means having a burner means secured therein. The fumes are incinerated in the heat generating means by the flame of said burner means so as to provide hot gas which is recirculated to the kiln for purposes of conducting the aforementioned vaporization step. The firing rate of the burner means is regulated to maintain the recirculating hot gas close to a predetermined temperature, and the air to fuel ratio supplied to the burner means is varied to maintain the concentration of oxygen in the recirculating hot gas close to a predetermined level.

11 Claims, 1 Drawing Figure

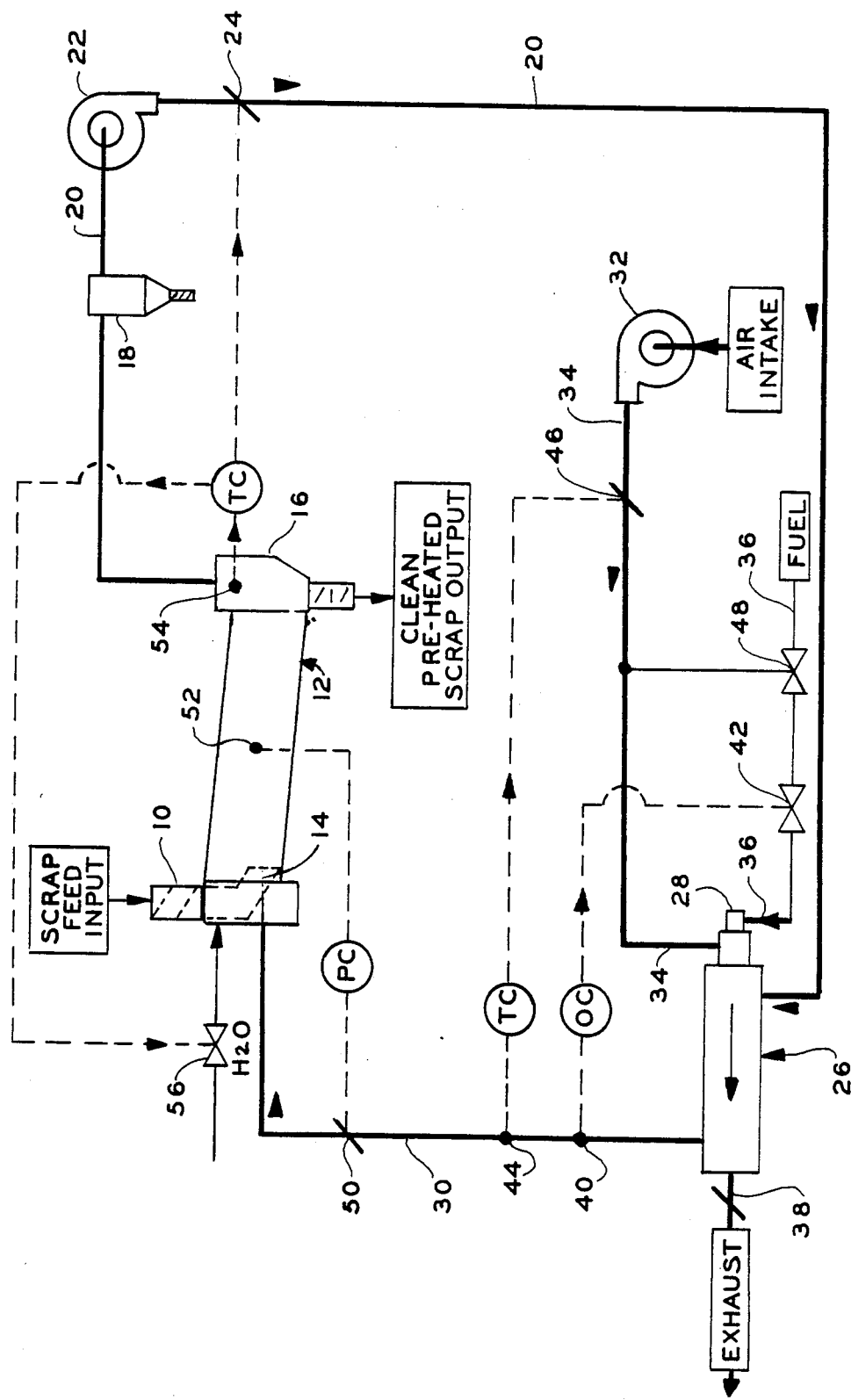
FIGURE

METHOD FOR RECLAIMING CONTAMINATED SCRAP METAL

This application is a continuation of application Ser. No. 488,923, filed Apr. 27, 1983, now abandoned.

BACKGROUND OF THE INVENTION

The present invention relates generally to the reclaiming of scrap metal, and more particularly to an improved, efficient reclamation process utilizing hydrocarbon combustibles contaminating the metal.

In the recovery of metals from scrap metal, one of the greatest problems encountered has been the removal of hydrocarbon combustibles, such as oil, paint, grease, and the like, contaminating the metal. Rather elaborate heating processes have been developed to vaporize and remove hydrocarbon contaminants while avoiding oxidation of the desired metal. Oxidation is to be avoided, quite obviously, as such invariably decreases metal recovery. Avoiding oxidation, however, is not so easily accomplished, particularly when reclaiming metal such as aluminum which happens to be particularly troublesome as it tends to oxidize very easily at elevated temperatures. Metal oxidation can be minimized, however, by precise control of process atmospheric conditions. Precise process control can also result in reduced process energy consumption which, in view of today's high energy costs and the energy intensive nature of such processes, is, from an economical standpoint, quite significant.

One process for reclaiming scrap metal and having the same objectives as discussed above is disclosed in U.S. Pat. No. 4,264,060 to Noel H. Twyman. Twyman recognized the economic value of collecting the unburned hydrocarbon vapors emanating from the heated scrap and using them as a supplemental fuel source for heating. In Twyman, the metal scrap is concurrently passed through a rotary kiln with a recycled stream of hot gas. The heated scrap is separated from the gas stream at the discharge end of the kiln and is fed to a melter used to recover the metal. The separated gas stream is then burned and thus heated in an appropriate burner or incinerator, thereby providing the stream of hot gas which is recycled to the rotary kiln for purposes of heating the scrap.

Another scrap metal reclamation process using unburned hydrocarbon fumes as a supplemental source for heating purposes is disclosed in U.S. Pat. No. 3,839,016 to Robert K. Rawlings. The Rawlings process will be discussed in more detail, infra. Both the Rawlings and Twyman processes, however, suffer from process control problems. Both are also unnecessarily complex.

BRIEF SUMMARY OF THE INVENTION

The present invention has as its objectives solving the aforementioned problems. Accordingly, one object of the present invention is to provide an uncomplicated, easily operated process for reclaiming scrap metal. Another object is to provide a process having precise control of process parameters. Yet another object is to provide a process that is both economical and efficient in that minimal process downtime and substantial savings in fuel costs are obtainable.

In accordance with the aforementioned objectives, the present invention provides a method of reclaiming metal contaminated with hydrocarbon combustibles. It includes the step of feeding particles of the hydrocarbon contaminated metal into a kiln, preferably a rotary kiln, for purposes of vaporizing the contaminants. Vaporization is conducted in the kiln in an atmosphere having a temperature and oxygen concentration that permits the production of partially unburned hydrocarbon fumes and minimizes oxidation of the metal being reclaimed. When the metal is substantially clean, i.e. contaminants vaporized, it is separated from the fumes and preferably fed directly to a melting furnace. The partially unburned fumes are then transported from the kiln to a heat generating means, preferably an incinerator, having a burner means secured therein. The burner is supplied with fuel and air. Hot gas is provided in the heat generating means by firing the burner and incinerating the partially unburned fumes. The hot gas is then recirculated to the kiln for purposes of continuing the vaporization process. The temperature of the hot gas being recirculated to the kiln is maintained close to a predetermined point by regulating the firing rate of the burner. The oxygen concentration of the hot gas being recirculated is maintained near a predetermined level by varying the ratio of air to fuel being supplied to the burner means.

BRIEF DESCRIPTION OF THE DRAWING

The sole drawing is a schematic flow diagram illustrating one preferred manner of utilizing the present invention.

DESCRIPTION OF A PREFERRED EMBODIMENT

Referring now to the sole drawing, it will be appreciated that particles of hydrocarbon contaminated metal scrap, such as aluminum scrap, (not shown) of any convenient, easily handled size can be fed through an inlet chute 10 into the interior of a conventional rotary kiln 12. In order to control the kiln so that it operates properly and to prevent possible atmospheric contamination, it is preferred to locate an air lock (not numbered) within the chute. Chute and air lock designs are considered to be conventional and are described in U.S. Pat. No. 4,264,060 to Twyman, which hereby is incorporated by reference.

A rotary kiln is preferred as it lifts and elevates the scrap particles as it turns causing them to fall throughout the interior of the kiln in a cascading fashion. Such cascading action is advantageous in that it continuously exposes the surfaces of the metal particles within the kiln to hot gas which is channeled into the interior of the kiln by hot gas inlet pipe 14. This enables the hot gas stream to effectively transfer heat to the metal particles. It also directly exposes the hydrocarbon coatings to the hot gas stream which vaporize into partially unburned hydrocarbon fumes, providing the temperature and oxygen content of the hot gas are such to enable such vaporization. With vaporization then complete, the metal will be substantially contaminant-free or clean as referred to hereinafter, and the gas in the kiln will be fume-laden.

Returning to the drawing, it can be seen that the rotary kiln is slightly tilted. Therefore, scrap entering the uphill inlet side of the kiln will, by virtue of gravity, eventually travel downwardly toward the lower discharge end of the kiln and enter what is referred to as a separator 16. Separator 16 receives both the metal particles from the kiln, which at this point will be substantially clean, and the fume-laden gas stream from within the kiln and, by gravity, separates the metal particles from the fume-laden gas stream. An excellent description of a separator suitable for use in carrying out the method of the present invention is also described in previously-mentioned U.S. Pat. No. 4,264,060 to Twyman. The separated metal particles are then preferably fed directly to a melting furnace. The separated fume-laden gas stream is then preferably channeled to a dust collector 18 which serves to remove any entrained inorganic material from the gas. Dust collector 18 is preferably of conventional construction and includes a bottom discharge chute and a gas outlet (not separately numbered) connected to a further line 20 containing a draft fan 22 which assists in providing the desired gas flow throughout the system. Line 20 also contains a conventional flow regulator commonly referred to as a damper 24. Damper 24 is of conventional construction and is operated as hereinafter more specifically indicated to regulate gas flow through the system for purposes of preventing the system from overheating.

Fume-laden gas flowing through the damper is then conveyed to a conventional combustor or incinerator 26. In the incinerator the fume-laden gas is contacted by the flame from a conventional burner 28 for purposes of reheating the gas which, when reheated, is recirculated to kiln 12 via line 30. The burner is supplied with air for combustion purposes by a fan 32 connected to a line 34 leading from the fan to the burner. Fuel is supplied to the burner through a line 36. It can also be seen that the incinerator has an exhaust stack 38 which relieves excess pressure building up in the system. Exhaust stack 38 could be located almost anywhere in the system, but it is preferably located in the incinerator because gas at this point, after having been incinerated, is quite clean, i.e. free from environmental pollutants.

Returning now to the step of reheating the gas, it will be appreciated that the burner flame, in addition to reheating said gas, also ignites or incinerates the fumes present in the gas. Those skilled in the art will appreciate that the fumes themselves provide a supplemental fuel source for heating the gas, i.e. in addition to the primary fuel source which is the fuel supplied to the burner. Accordingly, it will be understood that gas to be reheated which is heavily laden with fumes will require less fuel from the burner than would gas which is relatively fume-free. The fuel value of hydrocarbon fumes, and an attempt to make use of such in reclaiming scrap metal, are discussed in U.S. Pat. No. 3,839,016 to Robert K. Rawlings. The system described by Rawlings, however, is quite impractical from a commercial standpoint because it cannot handle a high fume content without reducing, thus varying, the feed rate of scrap being fed into the kiln. Varying the feed rate is not a very accurate way of reducing fume content since fume content is not directly proportional to the volume or weight of scrap being fed into the kiln. Rather, fume content is more dependent on the type of can being treated. For example, some cans, such as food cans, have thicker interior hydrocarbon coatings than others, such as beer cans. Therefore, with the Rawlings process, scrap having a high concentration of aluminum food cans will have to be fed into the kiln at a slower rate than that having a high concentration of beer cans. Such control, however, is impractical, at least from a commercial standpoint, because it is extremely difficult to tell what kind of scrap is being fed into the kiln because most scrap charges contain varying amounts of each. Furthermore, visual inspection of scrap is difficult and hand-sorting is certainly impractical. Even more importantly, it can be seen that having to stop or slow the feed rate, as is required by the Rawlings process, necessarily detracts from process economy.

Returning to the present invention, it will be recognized that an important aspect thereof involves process control. It will be appreciated that problems encountered by others, such as fume buildup, are easily handled. To accomplish such, the present invention maintains precise control over the temperature and oxygen level of the hot gas being recirculated from the incinerator to the kiln. Oxygen control is provided by locating a conventional oxygen sensing device 40 in line 30 channeling hot gas from the incinerator to the kiln. The oxygen sensor provides input to an air to fuel ratio valve 42 installed in line 36 supplying fuel to the burner. Ratio valve 42 in response to changes in the oxygen level in line 30 varies the ratio of air to fuel being supplied to the burner to maintain a preset oxygen level. If, for example, the oxygen level drops below its predetermined level, the ratio valve will respond by increasing the air to fuel ratio. If the fuel being supplied to the burner is natural gas, it has been found that satisfactory control over the oxygen level can be obtained permitting the air to fuel ratio to vary from 10:1 to 40:1.

Precise control of the oxygen level in the hot gas is important in that it should be high enough to permit incineration of all the hydrocarbon fumes present in the incinerator and yet low enough to prevent flammable combustion of hydrocarbons in the kiln. Flammable combustion in the kiln is to be avoided as it can cause hot "oxidation" spots in the metal being reclaimed, which is particularly troublesome when reclaiming aluminum. It has been found when reclaiming aluminum that maintaining the oxygen at a level somewhere between 6 and 12% will provide satisfactory results, i.e. prevent oxidation of the aluminum being reclaimed, prevent flammable combustion in the kiln and yet obtain complete or substantially complete combustion of the fumes in the incinerator. Quite obviously, since oxygen level and temperature are interdependent for combustion purposes, high levels of both (e.g. greater than 12% oxygen and 1500° F.) are to be avoided if flammable combustion in the kiln is to be avoided. Similarly, low levels of both (e.g. less than 6% oxygen and 1200° F.) are to be avoided if complete combustion of the fumes in the incinerator is to be obtained. It has been found in reclaiming aluminum scrap that superior results can be obtained by maintaining the oxygen level in the hot gas in line 30 around 7% and the temperature thereof close to 1400° F.

Precise temperature control of the hot gas being recirculated to the kiln is provided by locating a temperature sensing device 44 in line 30. Temperature sensing device 44, which can be of any conventional design, provides input to an air flow control valve 46 which will increase air flow to burner 28 if a temperature drop in line 30 is sensed. A fuel/air regulator 48 controlling the flow of fuel through line 36 to the burner is connected to the downstream side of air valve 46 on air line 34. Upon sensing an increase or decrease in air flow pressure in line 34, air valve 46 will automatically increase or decrease the flow of fuel to the burner. Hence, if a temperature drop in line 30 is sensed, both fuel and air flow to the burner are increased proportionally, i.e. without a change in the air to fuel ratio, thereby increasing the burner's firing rate. Similarly, if a temperature rise is sensed, fuel and air flow to the burner are decreased, thereby decreasing the burner's firing rate, again proportionally without a change in the air to fuel ratio. The air to fuel ratio is only changed, as previously mentioned, when a change in the oxygen level in line 30 is sensed. Thus, temperature control is provided by regulating the burner's firing rate and oxygen control is provided by regulating or varying the burner's air to fuel ratio.

It can also be seen in the drawing that a kiln pressure control valve 50 is located in line 30. Its purpose is to maintain static pressure in the kiln for the purpose of preventing or minimizing gas leakage both into and out of the kiln. It preferably should be kept slightly negative with respect to ambient pressure. As can be seen in the drawing, valve 50 maintains static pressure by responding to changes in the pressure sensed by a conventional pressure sensing device 52 located in the kiln.

The embodiment illustrated in the drawing also employs an overheating control loop for safety purposes. Under ordinary process conditions, it is not used. It will activate, however, if the kiln gets too hot which could happen, for example, if the feeding of scrap to the kiln stops for a significant period of time.

The overheating control loop employs a conventional temperature sensing control device 54 located in separator 16 of the kiln which provides input to two temperature control devices, i.e. previously-mentioned flow control damper 24 and a water control valve 56. If a significant temperature increase is sensed, flow control damper 24 will partially close and will completely close if necessary. When closed or partially closed, gas flow throughout the system will slow, thereby minimizing the flow of fresh hot gas from the incinerator to the kiln. Note that in the previously-mentioned temperature control loop, sensor 44 will also sense a temperature rise and will reduce the supply of fuel and air to burner 28, thereby further minimizing the flow of hot gas to the kiln. With hot gas flow reduced, kiln 12 will, in most cases, cool off. If, however, kiln temperature continues to rise or does not drop, water control valve 56 will open to permit water to flow into the kiln for cooling purposes.

The following results were obtained in carrying out the method of the present invention on a system utilizing the aforementioned conventional apparatus. 18,000 lbs/hr of 3% coated aluminum scrap, i.e. can scrap having approximately 3% of its weight comprised of can lacquer or coatings, were treated in accordance with the method of the present invention. Natural gas fuel consumption by the burner was reduced from over 1000 Btu/lb of treated scrap to less than 500 Btu/lb of treated scrap. From these results, it can be seen that process fuel consumption has been drastically reduced, thereby resulting in significantly enhanced process economy. It should also be noted that no flammable combustion in the kiln was experienced.

While the invention has been described in terms of a preferred embodiment, the claims appended hereto are intended to encompass all embodiments which fall within the spirit of the invention.

What is claimed is:

1. A method of reclaiming metal contaminated with hydrocarbon combustibles, said method comprising the steps of:
   feeding particles of said contaminated metal into a kiln;
   vaporizing the hydrocarbon combustibles by heating said particles in said kiln in a hot gas atmosphere having a temperature and oxygen level sufficient to provide partially unburned hydrocarbon fumes and clean and relatively unoxidized metal;
   discharging the clean metal from the kiln;
   transporting the fumes in the kiln to a heat generating means having a burner means secured therein, said burner means being supplied with fuel and air;
   providing hot gas in said heat generating means by firing said burner and incinerating said fumes;
   recirculating said hot gas to the kiln to provide said hot gas atmosphere;
   regulating the firing rate of the burner means to maintain the temperature of the hot gas being recirculated close to a predetermined point; and
   varying the ratio of air to fuel being supplied to the burner means by adjusting the quantity of said fuel being supplied to the burner means in response to sensed changes in the oxygen concentration of the recirculated hot gas to maintain the oxygen concentration of the hot gas being recirculated close to a predetermined level.

2. The method of claim 1 wherein the predetermined temperature is maintained by controlling the flow of air being supplied to the burner which, in turn, automatically controls the flow of fuel to the burner.

3. The method of claim 1 wherein the predetermined oxygen level is maintained by having an air to fuel ratio valve located in the line supplying fuel to the burner.

4. The method of claim 1 wherein the metal is aluminum or an alloy thereof.

5. The method of claim 1 wherein the fuel is natural gas.

6. The method of claim 5 wherein the air to fuel ratio may vary from 10:1 to 40:1.

7. The method of claim 1 wherein the vaporization step is flameless.

8. The method of claim 1 wherein the temperature and oxygen levels are sufficient to incinerate the fumes in the heat generating means and yet avoid flammable combustion of the hydrocarbons in the kiln.

9. The method of claim 1 wherein the temperature of the hot gas being circulated to the kiln and the oxygen level of said gas are respectively maintained between 1200° and 1500° F. and 6 and 12%.

10. The method of claim 1 wherein the temperature of said hot gas is about 1400° F. and the oxygen level is about 7%.

11. A process as recited in claim 1 wherein neither said kiln temperature nor said temperature of the hot gas being recirculated to the kiln is maintained under ordinary non-overheating operating conditions by varying the flow of fumes to the heat generating means.

* * * * *